US009025177B2

(12) United States Patent
Koike et al.

(10) Patent No.: US 9,025,177 B2
(45) Date of Patent: May 5, 2015

(54) MEDIA PROCESSING DEVICE, MEDIA PROCESSING SYSTEM, AND CONTROL METHOD OF A MEDIA PROCESSING DEVICE

(71) Applicant: Seiko Epson Corporation, Tokyo (JP)

(72) Inventors: Toshiaki Koike, Shiojiri (JP); Yuya Iwasa, Shiojiri (JP); Takako Kasuga, Shiojiri (JP); Kiyomi Kuroda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/332,795

(22) Filed: Jul. 16, 2014

(65) Prior Publication Data

US 2015/0036165 A1    Feb. 5, 2015

(30) Foreign Application Priority Data

Jul. 31, 2013   (JP) ................. 2013-158650

(51) Int. Cl.
*H04N 1/04*   (2006.01)
*H04N 1/00*   (2006.01)

(52) U.S. Cl.
CPC ................. *H04N 1/00074* (2013.01)

(58) Field of Classification Search
CPC .................................................. H04N 1/00074
USPC .................................. 358/1.14, 1.9, 474, 498
See application file for complete search history.

(56) References Cited

U.S. PATENT DOCUMENTS

2009/0190170 A1    7/2009   Yoshie

FOREIGN PATENT DOCUMENTS

| JP | 2004-345253 | * 12/2004 | ............... B41J 15/04 |
| JP | 2009-178886 A | 8/2009 | |
| JP | 2011-051252 A | 3/2011 | |

* cited by examiner

*Primary Examiner* — Houshang Safaipour

(57) ABSTRACT

After processing a medium B with a processing unit based on control data received from a host computer 92 and stopping conveyance of the medium B, the media processing device control unit 100 of a printer 1 prohibits processing the medium B by the processing unit, waits until displacement of the medium B is detected by a media orientation detection means 65, and reports starting to wait to the host computer 92. When displacement of the medium B is detected by the media orientation detection means 65 while waiting, the media processing device control unit 100 cuts the medium B with the automatic paper cutter 60, and then cancels prohibition of processing medium B by the processing unit.

13 Claims, 8 Drawing Sheets

MEDIA PROCESSING DEVICE, MEDIA PROCESSING SYSTEM, AND CONTROL METHOD OF A MEDIA PROCESSING DEVICE

CROSS-REFERENCE TO RELATED APPLICATION(S)

Priority is claimed under 35 U.S.C. §119 to Japanese Application no. 2013-158650 filed on Jul. 31, 2013, which is hereby incorporated by reference in its entirety.

BACKGROUND

1. Technical Field

The present disclosure relates to a media processing device that processes media, to a media processing system, and to a control method of the media processing device.

2. Related Art

Media processing devices (such as tag and label producers) that produce tags, labels, and other tickets by printing images on a continuous medium and then cutting the medium are known from the literature. See, for example, JP-A-2011-51252.

This type of media processing device is generally connected to a control device, and runs processes related to producing tickets as controlled by the control device.

However, when the media processing device cuts the media and produces tickets as described above, the tickets produced by cutting the media can accumulate near the paper exit where the media is discharged and interfere with discharging media from the paper exit. In a system in which the media processing device executes processes as controlled by the control device, there is a need for the control device to be able to know the status of the media processing device.

SUMMARY

The present invention is directed to preventing tickets from accumulating near the paper exit, and enabling the control device to know the status of the media processing device.

A media processing device according to one aspect of the invention has a processing unit that processes media; a conveyance unit that conveys the media; an exit from which the media conveyed by the conveyance unit is discharged; a detection unit that detects displacement of the media discharged from the paper exit in a direction different from the conveyance direction of the conveyance unit; a cutting unit that cuts the media based on detection of said displacement by the detection unit; a control unit that processes the medium by the processing unit, stops media conveyance by the conveyance unit, and then generates information indicating pausing detection of the displacement by the detection unit; and a communication unit that transmits the information.

When the medium is moved so that it is displaced in a specific direction in this aspect of the invention, the medium is cut and a ticket is issued. Tickets are therefore prevented from being automatically produced continuously and collecting at the paper exit.

After processing media by the processing unit and stopping media conveyance by the conveyance unit, the media processing device according to this aspect of the invention generates information indicating that detecting media displacement by the detection unit is paused, and sends this information to the control device. As a result, the media processing device knows the standby mode started, and based thereon can execute a corresponding process.

Preferably, the control unit stops processing the media by the processing unit when generating the information.

This aspect of the invention stops media processing by the processing unit while waiting for detection of media displacement by the detection unit.

After cutting the media based on the detection unit detecting media displacement at the cutting unit, the control unit in another aspect of the invention generates second information indicating that waiting to detect media displacement ended, and the communication unit transmits the second information.

The control device in this aspect of the invention can therefore know that waiting to detect media displacement has ended in the media processing device, and based thereon can execute a corresponding process.

Another aspect of the invention is a media processing system including a control device that transmits control data instructing processing media, and a media processing device. The media processing device includes a processing unit that processes media; a conveyance unit that conveys the media; an exit from which the media conveyed by the conveyance unit is discharged; a detection unit that detects displacement of the media discharged from the paper exit in a direction different from the conveyance direction of the conveyance unit; a cutting unit that cuts the media based on detection of said displacement by the detection unit; a control unit that processes the medium by the processing unit, stops media conveyance by the conveyance unit, and then generates information indicating pausing detection of the displacement by the detection unit; and a communication unit that transmits the information.

After processing media by the processing unit and stopping media conveyance by the conveyance unit, the media processing device in this aspect of the invention generates information indicating that detecting media displacement by the detection unit is paused, and sends this information to the control device. As a result, the media processing device knows the standby mode started, and based thereon can execute a corresponding process.

Preferably, after cutting the media based on the detection unit detecting media displacement at the cutting unit, the control unit of the media processing device generates second information indicating that waiting to detect media displacement ended; and the communication unit of the media processing device transmits the second information to the control device.

The control device in this aspect of the invention can therefore know that waiting to detect media displacement has ended in the media processing device, and based thereon can execute a corresponding process.

Further preferably in this aspect of the invention, the control device stops transmitting the control data after receiving the information.

When the media processing device is waiting to detect displacement of the medium, this aspect of the invention can prevent the control device from sending control data and unprocessed control data accumulating in the media processing device as a result.

Further preferably, the control device transmits cancellation data instructing cancelling pausing displacement detection after receiving the information; and the control unit of the media processing device cancels pausing displacement detection based on the cancellation data.

When the media processing device is pausing detecting media displacement by the detection unit in this aspect of the invention, the control device can cancel the mode in which the media processing device has paused detecting media displacement.

Another aspect of the invention is a control method of a media processing device, the control method including receiving control data instructing processing media; processing the media based on the received control data; stopping media conveyance after processing the media; generating and transmitting information indicating pausing detection of media displacement in a direction different from the conveyance direction of the media when media conveyance stops; and cutting the media when media displacement is detected.

With this aspect of the invention, after processing media by the processing unit and stopping media conveyance by the conveyance unit, the media processing device according generates information indicating that detecting media displacement by the detection unit is paused, and sends this information to the control device. As a result, the media processing device knows the standby mode started, and based thereon can execute a corresponding process.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
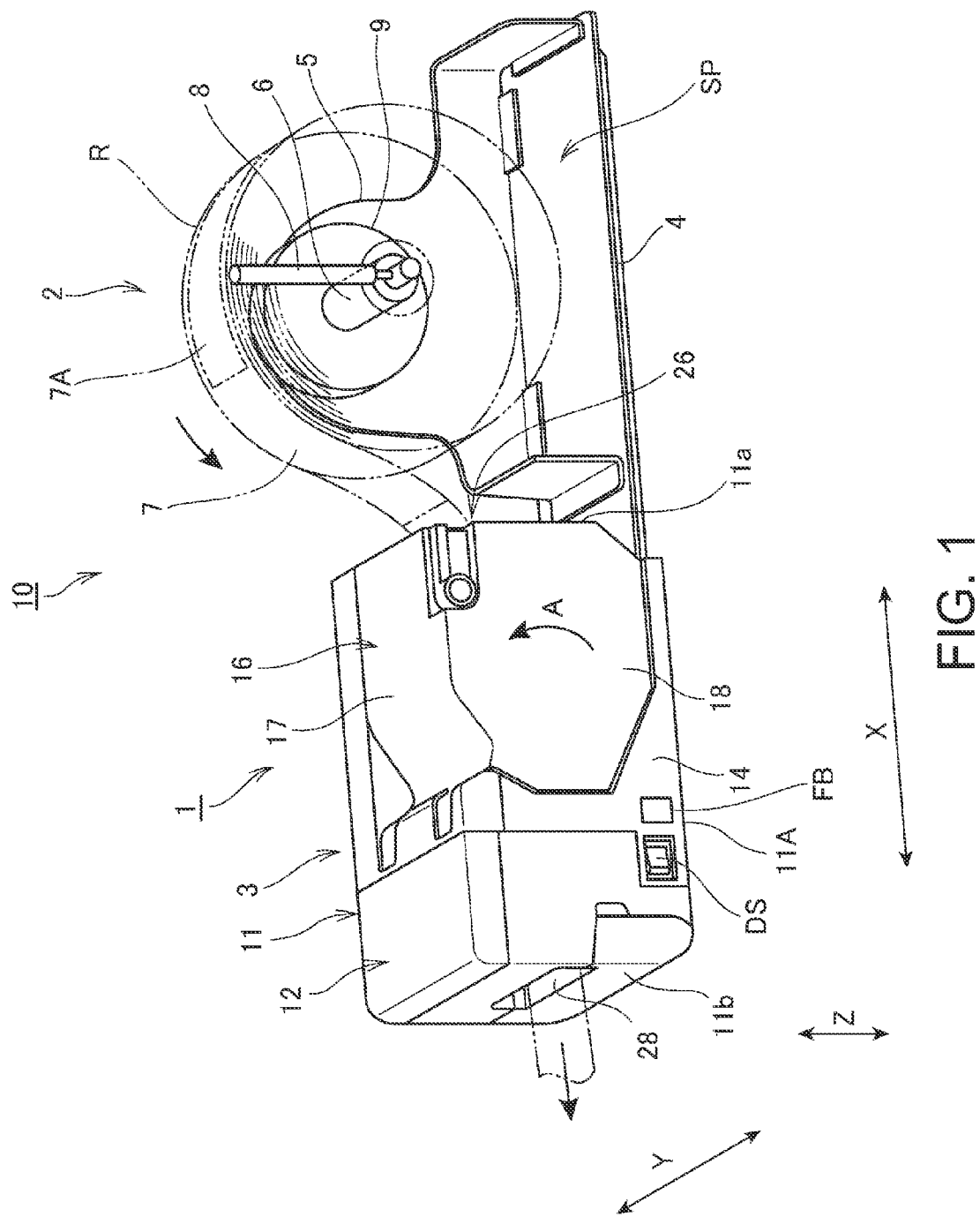
FIG. 1 an oblique view illustrating a ticket issuing device according to a preferred embodiment of the invention.

FIG. 1 illustrates a ticket issuing device 10 according to this embodiment of the invention.

In FIG. 1, the x-axis indicates the conveyance direction of the medium used in the ticket issuing device 10, the y-axis indicates the direction of the width of the medium, and the z-axis indicates the direction perpendicular to the x-axis and the y-axis.

The ticket issuing device 10 according to this embodiment of the invention is installed at the service counter of an airline in an airport, for example, and is used to issue tickets such as baggage tags and boarding passes.

A baggage tag or boarding pass issued by the ticket issuing device 10 has an embedded IC (integrated circuit) tag, and required information is recorded in the IC tag. For example, information such as the number of the flight that is to carry the luggage (baggage) and the date and time the baggage tag was issued are recorded. Required information is also printed on the surface of the baggage tag or boarding pass. For example, the flight number of the plane, the name of the owner of the luggage, and other predetermined required information is printed.

As shown in FIG. 1, the ticket issuing device 10 includes a printer 1 (media processing device), and a paper feed device 2 that supplies media to the printer 1.

The paper feed device 2 includes a base 4 that is removably connected to the main unit 3 of the printer 1, a paper support unit 5 attached to the base 4, and a roll paper spindle 6 attached to the paper support unit 5. The roll paper R fits onto the roll paper spindle 6 from the distal end thereof. A stop 8 that prevents the roll paper from slipping off the roll paper spindle 6 is attached perpendicularly to the roll paper spindle 6 at the distal end of the roll paper spindle 6. A disk-shaped spacer 9 for adjusting to the width of the roll paper is removably attached to the roll paper spindle 6, thereby enabling installing and using roll paper of different widths.

Roll paper R and fanfold paper can be selectively stored in the paper feed device 2 and supplied to the printer 1. Media stored in the ticket issuing device 10 are collectively referred to as medium B below.

The roll paper R in this embodiment is a medium comprising paper labels 7 connected continuously lengthwise. After a specific process described below is applied by the printer 1, each paper label 7 is cut off and used as a ticket (such as a baggage tag). An RFID (radio frequency identification) tag 7A (IC tag) is affixed or embedded at a specific position on each paper label 7.

The roll paper R is set in the paper feed device 2 in FIG. 1.

The base 4 can also be used as a tray for fanfold paper, which is another type of continuous paper. Fanfold paper is a medium composed of ticket portions of a constant length folded together at a regular interval into a stack. After a specific process described below is applied by the printer 1, each ticket portion is cut off and used as a ticket (such as a boarding pass). When using fanfold paper, the fanfold paper is stored in the space SP created by the base 4 and paper support unit 5.

The main unit 3 of the printer 1 has an outside case 11. This outside case 11 includes a main case 11A, front case 12, and cover 16.

The main case 11A is the base part of the outside case 11, and other case members of the outside case 11 and the paper feed device 2 described above are attached to the main case 11A. A power switch DS that turns the power on/off, and a feed button FB that instructs feeding the medium B, are disposed to the main case 11A.

The front case 12 is attached to the main case 11A at the opposite end of the printer 1 as the paper feed device 2. A rectangular discharge exit 28 (paper exit) that is long in the Y direction is formed in the front 11b of the front case 12 in the middle between the top and bottom. The print mechanism 61 described below is housed in the front case 12.

The cover 16 can open and close freely to the outside case 11. A paper entrance 26 is formed between the back end 11a of the outside case 11 and the end of the cover 16.

Figure 2:
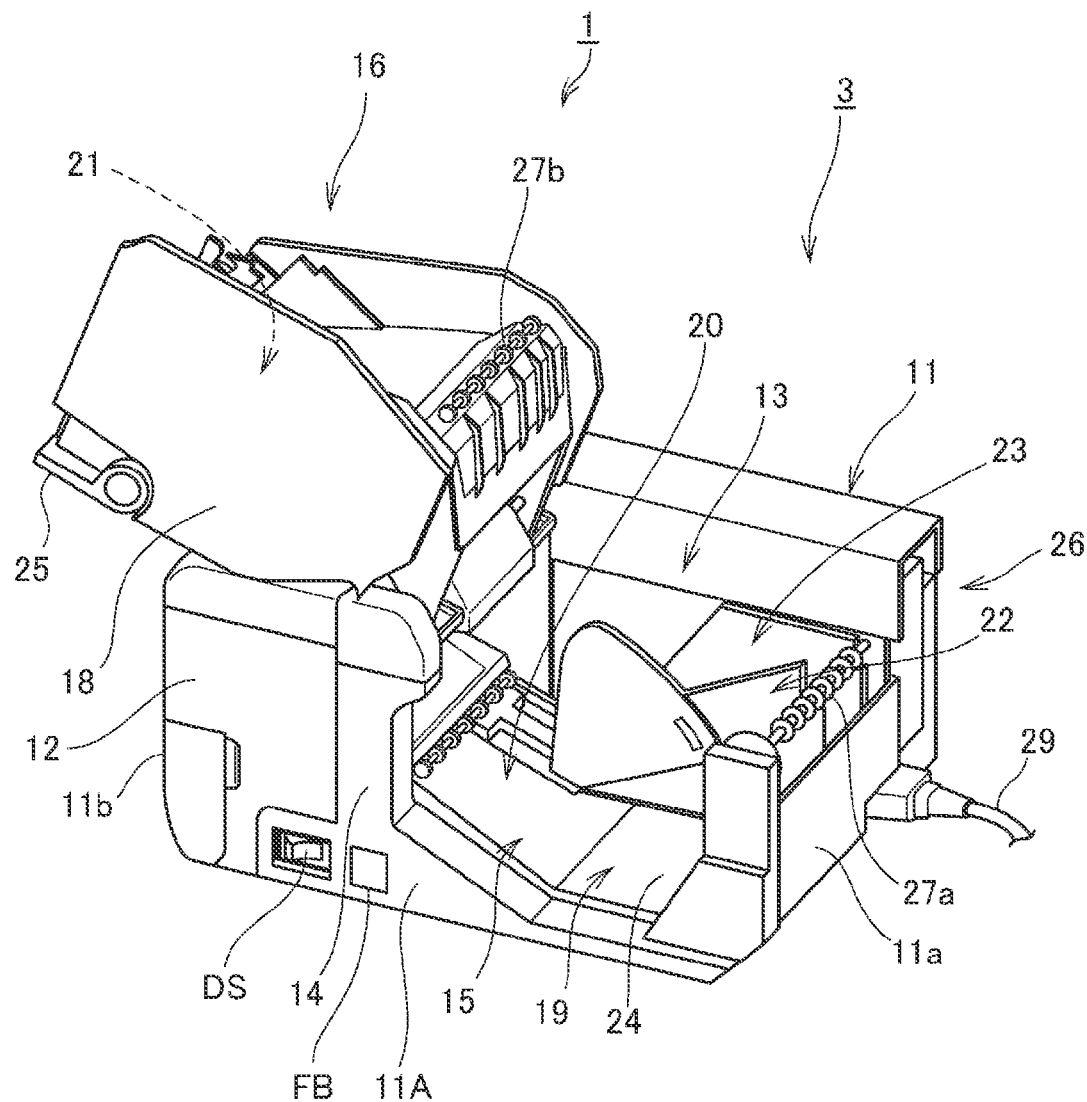
FIG. 2 is an oblique view of the printer when the cover is open.

FIG. 2 is an oblique view of the printer unit 3 with the cover 16 open.

The cover 16 covers the medium B paper conveyance path 19, and can open and close in the direction of arrow A (FIG. 1) pivoting at the end towards the front of the printer.

As shown in FIG. 2, rotating the cover 16 open exposes a top opening 13. A side opening 15 contiguous to the top opening 13 is formed on one side 14 of the outside case 11.

When closed as shown in FIG. 1, the cover 16 covers the top opening 13 and side opening 15. The cover 16 includes a top cover part 17 (FIG. 1) that covers the top opening 13, and a side cover part 18 that covers the side opening 15. The cover 16 pivots at the end of the top cover part 17 at the front of the printer unit 3 and can open from the closed position shown in FIG. 1 to the fully open position shown in FIG. 2. When the cover 16 opens, a paper conveyance path 19 for the medium B formed inside the outside case 11, and a paper stage 20 formed in the paper conveyance path 19, are open and can be accessed from the top opening 13 and side opening 15.

One side of the width of the paper conveyance path 19, that is, one side of the printer unit 3, is a first paper guide 21 formed on the inside side of the side cover part 18. The other side of the width is either a second paper guide 22 that is removably installed to the bottom 24, which is the bottom of the paper conveyance path 19, or a third paper guide 23. When the second paper guide 22 is installed, the paper labels 7 can be guided by the first paper guide 21 and second paper guide 22, and when the second paper guide 22 is removed, the paper labels 7 can be guided by the first paper guide 21 and the third paper guide 23.

A lower guide roller 27a is disposed inside the paper entrance 26 on the outside case 11 side, and an upper guide roller 27b that is opposite the lower guide roller 27a when the cover 16 is in the closed position is disposed on the cover 16 side.

Figures 3A, 3B:
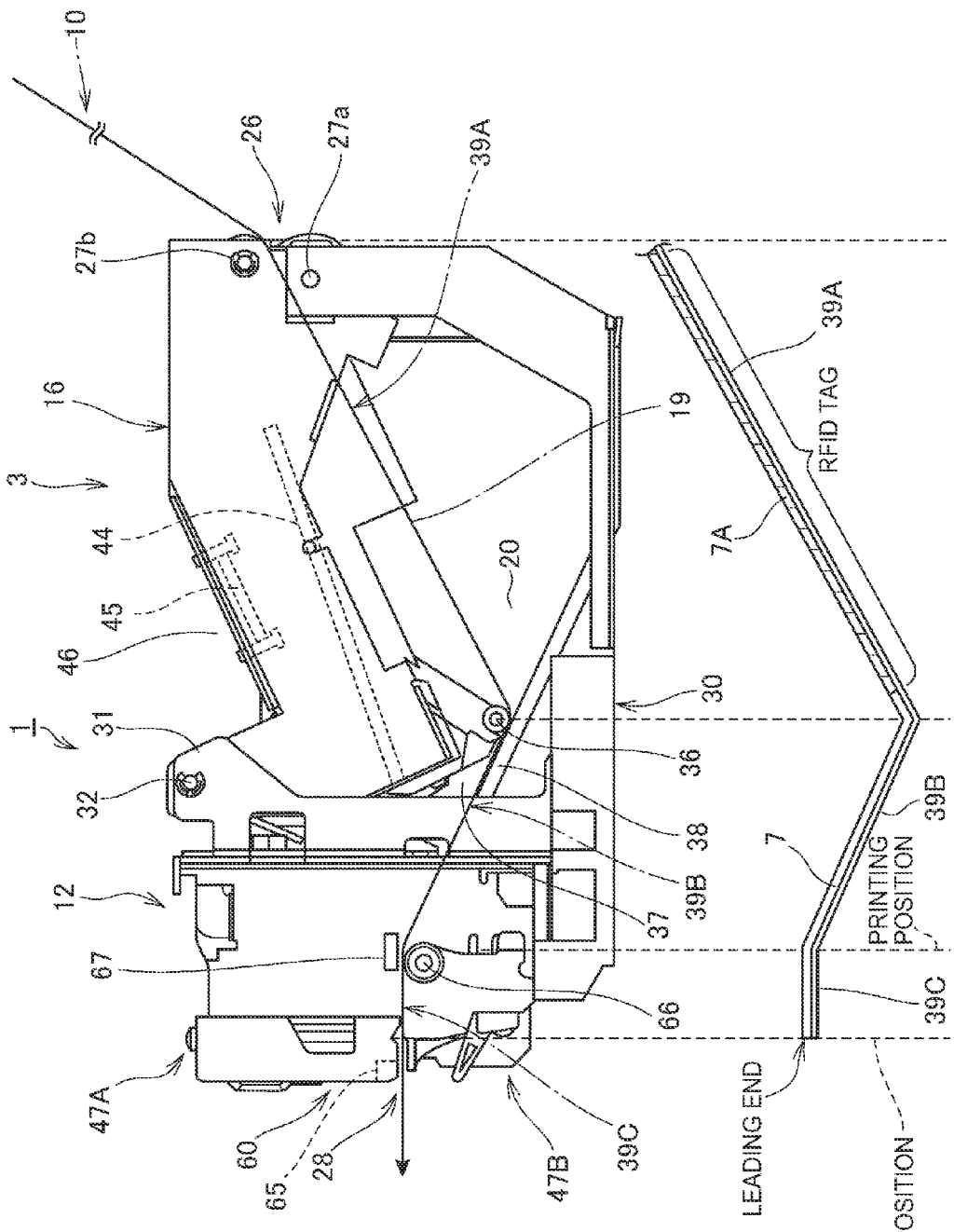
FIGS. 3A and 3B illustrate internal mechanisms of the printer.

FIG. 3 (A) illustrates the internal configuration of the printer unit 3, and shows the printer 1 from the side. FIG. 3 (B) shows the paper conveyance path 19 from FIG. 3 (A).

The internal mechanism of the printer unit 3 is configured with parts of the printer unit 3 mounted on a sheet metal main frame 30 that is covered by the outside case 11. Left and right support arms 31 that extend vertically are disposed to the main frame 30, a hinge pin 32 spans widthwise to the outside case 11 between the support arms 31, and the cover 16 can pivot freely on the axis of the hinge pin 32.

A tension roller 36 extends widthwise at a position below the paper entrance 26 and at the front of the paper stage 20 inside the printer unit 3. A paper conveyance path 19 that conveys media (paper labels 7 in the example shown in FIG. 3 (A)) past the tension roller 36 and a platen roller 66 (conveyance roller) located downstream from the tension roller 36 is formed between the paper entrance 26 and paper exit 28.

The paper conveyance path 19 includes an upstream path slope 39A near the paper entrance 26, a downstream path slope 39B on the downstream side of the upstream path slope 39A, and a horizontal path 39C further downstream near the paper exit 28. The upstream path slope 39A extends at a downward angle from the paper entrance 26 to the tension roller 36. The downstream path slope 39B continues downstream from the tension roller 36 on an upward slope to the platen roller 66. The downstream path slope 39B is formed by paper guides 37, 38 disposed vertically opposite each other. The horizontal path 39C continues downstream horizontally to the front from the platen roller 66 to the paper exit 28.

A thermal head 67 that prints on medium B (paper labels 7 in the example in FIG. 3) is disposed to the paper conveyance path 19 opposite a platen roller 66. The platen roller 66 is disposed to push against the heat-emitting face of the thermal head 67, and the paper labels 7 are conveyed by rotation of the platen roller 66. An automatic paper cutter 60 is disposed to the horizontal path 39C on the downstream side of the platen roller 66, and the medium (such as the paper labels 7) printed by the thermal head 67 is cut by the automatic paper cutter 60.

To print a paper label 7, the user first opens the cover 16, and pulls out the end of the paper labels 7 set in the paper feed device 2 and inserts it to the paper entrance 26. The paper labels 7 are guided by the first paper guide 21 and the second paper guide 22 or third paper guide 23 through the upstream path slope 39A to the tension roller 36. The paper labels 7 are then conveyed from the tension roller 36 along the downstream path slope 39B and between the thermal head 67 and platen roller 66, through the horizontal path 39C, and out from the paper exit 28. When the cover 16 is then closed, the leading end of the paper label 7 is held between the platen roller 66 and thermal head 67, and can be conveyed.

A tag reader/writer 46 that writes data to and reads data from an RFID tag 7A is disposed inside the outside case 11.

The tag reader/writer 46 communicates wirelessly with the RFID tag 7A by means of an antenna 44 and RF communication circuit 45. As shown in FIG. 3 (A), the antenna 44 is disposed facing the upstream path slope 39A (conveyance path), and the upstream path slope 39A is the data read/write position where the tag reader/writer 46 writes data and reads data. More specifically, the tag reader/writer 46 writes data and reads data while the RFID tag 7A affixed to the label 7 is located in the range of the upstream path slope 39A.

An RFID tag 7A is a passive IC tag that has an antenna for receiving RF signals transmitted from an external device such as the tag reader/writer 46, and drives an IC chip by means of power induced in the antenna. The tag reader/writer 46 and RFID tag 7A in this embodiment of the invention send and receive radio signals using a common protocol for RF tags.

More specifically, to write data to or read data from the RFID tag 7A, the tag reader/writer 46 first sends a carrier wave of a specific frequency, and sends a detection signal superimposed on the carrier wave. When EMF is induced in the antenna of the RFID tag 7A by the carrier wave transmitted by the tag reader/writer 46, the IC chip of the RFID tag 7A turns on due to the induced power, receives the detection signal, and then sends a signal responding to the detection signal. When the response signal sent by the RFID tag 7A is received, the tag reader/writer 46 sets the RFID tag 7A as the target for writing data and reading data, and sends a signal to start writing and reading data, while continuing to output the carrier wave. Next, the tag reader/writer 46 and RFID tag 7A communicate wirelessly while the tag reader/writer 46 continues outputting the carrier wave, reads data recorded in the RFID tag 7A, and writes data to the rewritable storage area in the IC chip of the RFID tag 7A.

Figure 4:
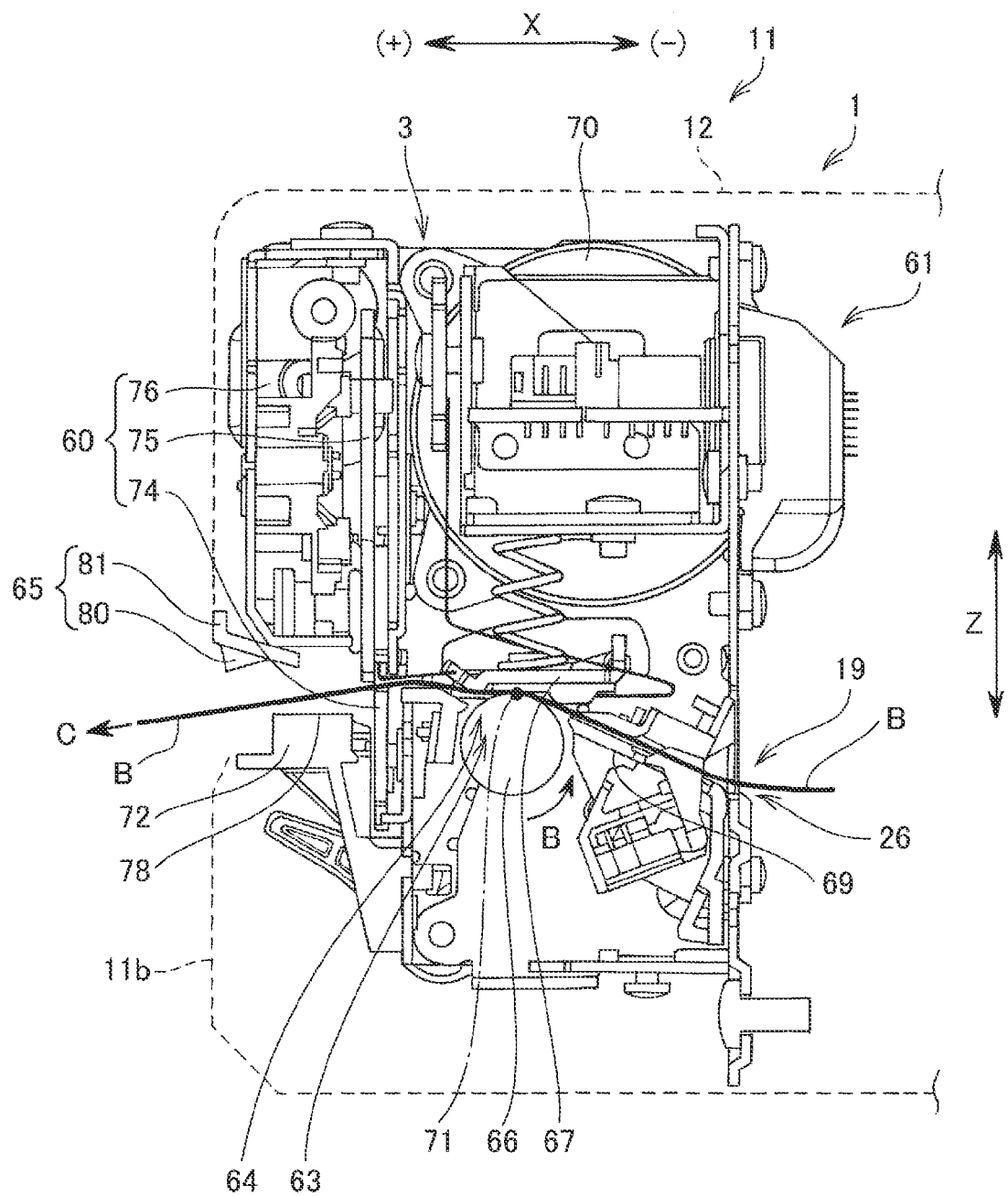
FIG. 4 is a section view illustrating the main components of the printer 1.
Figure 5:
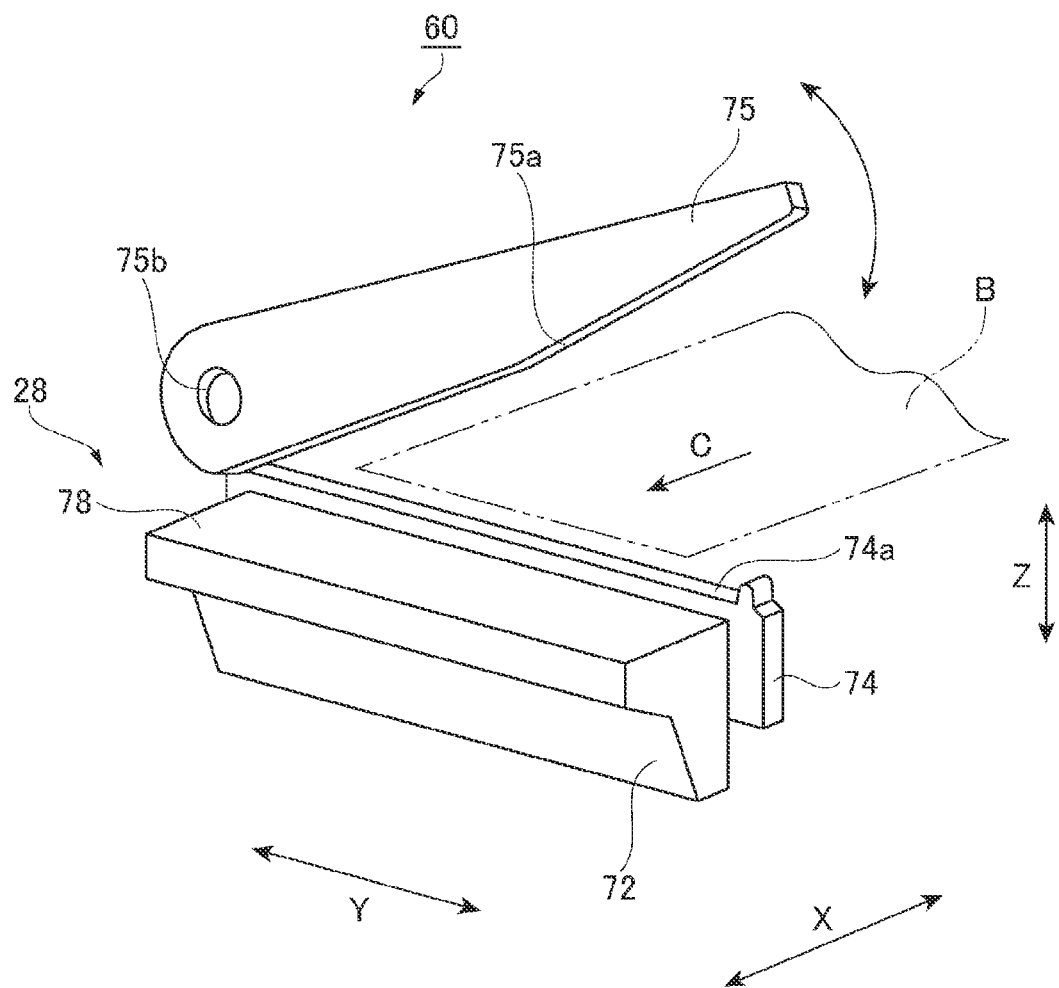
FIG. 5 describes the area around the automatic cutter.

FIG. 4 is a section view illustrating essential components of the printer 1. FIG. 5 illustrates the area around the automatic paper cutter 60 (described below) used as a cutting mechanism. Axes X, Y, Z in FIG. 4 and FIG. 5 are the same as axes X, Y, Z in FIG. 1.

As shown in FIG. 4, the print mechanism 61 is housed in the front case 12 of the outside case 11, and includes a conveyance mechanism 63 (conveyance unit), a print mechanism 64, the automatic paper cutter 60 (cutting unit), and a media orientation detection means 65 (detection unit).

The conveyance mechanism 63 conveys the medium B through the paper conveyance path 19 inside the printer 1.

The conveyance mechanism 63 includes the platen roller 66 (conveyance roller) disposed at a specific position on the paper conveyance path 19, and the thermal head 67 disposed opposing the platen roller 66. The paper entrance 26 to the print mechanism 61 is disposed on the upstream side (−) side of the conveyance mechanism 63 on the x-axis. The medium B is conveyed through the paper entrance 26 inside the printer 1, and is nipped between the thermal head 67 and platen roller 66. A paper guide 69 that guides the medium B is disposed on the paper conveyance path 19 between the paper entrance 26 and the thermal head 67 and platen roller 66.

Torque from the paper feed motor 70 is transferred through a gear train or other transfer mechanism not shown to the platen roller 66. When the platen roller 66 turns forward (the direction of arrow B in FIG. 4), the medium B is conveyed in conjunction with this rotation forward (from the upstream (−) side on the x-axis to the downstream (+) side) through the paper conveyance path 19. When the platen roller 66 turns in the opposite direction (the opposite direction as arrow B), the medium B is conveyed in reverse.

The paper feed motor 70 is a stepper motor.

The print mechanism 64 includes the thermal head 67.

The thermal head 67 has a heat unit 71 on the head surface facing the platen roller 66, and prints by applying heat to the medium B. The heat unit 71 has a plurality of heat elements arrayed in a line in the Y direction. When printing, the heat unit 71 part of the thermal head 67 is set directly opposite the platen roller 66, and the desired heat elements in the plural heat elements of the heat unit 71 are selectively heated while the medium B is conveyed by the platen roller 66. The printing surface of the medium B is coated with a heat-sensitive color layer, and the part opposite the heated heat element therefore changes color, forming a dot.

The medium B on which an image was printed then passes the automatic paper cutter 60 and media orientation detection means 65 described below, and is discharged to the outside from the paper exit 28 disposed on the downstream (+) side of the print mechanism 61 on the x-axis. When discharged, the medium B stops temporarily on the paper stage 72 disposed below the paper exit 28 on the z-axis.

The automatic paper cutter 60 used as the cutting mechanism functions to cut the medium B on which an image was printed by the thermal head 67 at the desired length, producing a ticket. The automatic paper cutter 60 in this embodiment is a scissor cutter that operates by one knife pivoting at one end thereof to and away from the other knife. Various other types of devices can alternatively be used as the automatic paper cutter 60, including a guillotine cutter in which one knife moves in a straight line to and away from the other knife.

As shown in FIG. 4 and FIG. 5, the automatic paper cutter 60 has a fixed knife 74, a movable knife 75, a cutter drive motor 76, and a movable knife drive transfer mechanism not shown. The fixed knife 74 is a rectangular blade with a straight cutting edge 74a formed along one side. The fixed knife 74 is fastened below the paper conveyance path 19 on the z-axis with the cutting edge 74a extending on the y-axis. The movable knife 75 is a blade with a straight cutting edge 75a formed on one side, and a pivot hole 75b formed near one end. The pivot hole 75b is disposed outside the path of the medium B on the y-axis.

The automatic paper cutter 60 also includes the cutter drive motor 76, and drive power from the cutter drive motor 76 is transferred through a movable knife drive transfer mechanism not shown to the movable knife 75. As a result, the movable knife 75 can pivot on the pivot hole 75b, and can pivot toward and away from the fixed knife 74 by driving the cutter drive motor 76. As a result, the medium B set between the fixed knife 74 and movable knife 75 is cut.

As shown in FIG. 4 and FIG. 5, the paper stage 72 is plastic in this example, and is disposed across the gap between the conveyance mechanism 63 and the front case 12 of the outside case 11, forming part of the surface of the paper conveyance path 19 over which the medium B slides. The paper stage 72 includes a rectangular paper guide surface 78 with the long side aligned with the paper width (y-axis) across the paper conveyance path 19, and the short side aligned with the paper conveyance direction (x-axis). The surface of the paper guide surface 78 is disposed slightly lower than the position of the cutting edge 74a of the fixed knife 74 on the z-axis. The paper guide surface 78 functions to guide the bottom surface of the medium B conveyed through the paper conveyance path 19.

The media orientation detection means 65 is described next with reference to FIG. 4 and FIG. 6.

When the medium B is displaced in a direction different from the media conveyance direction (upward in this example) after being discharged from the paper exit 28, the media orientation detection means 65 (detection unit) detects media displacement.

Figure 6A:
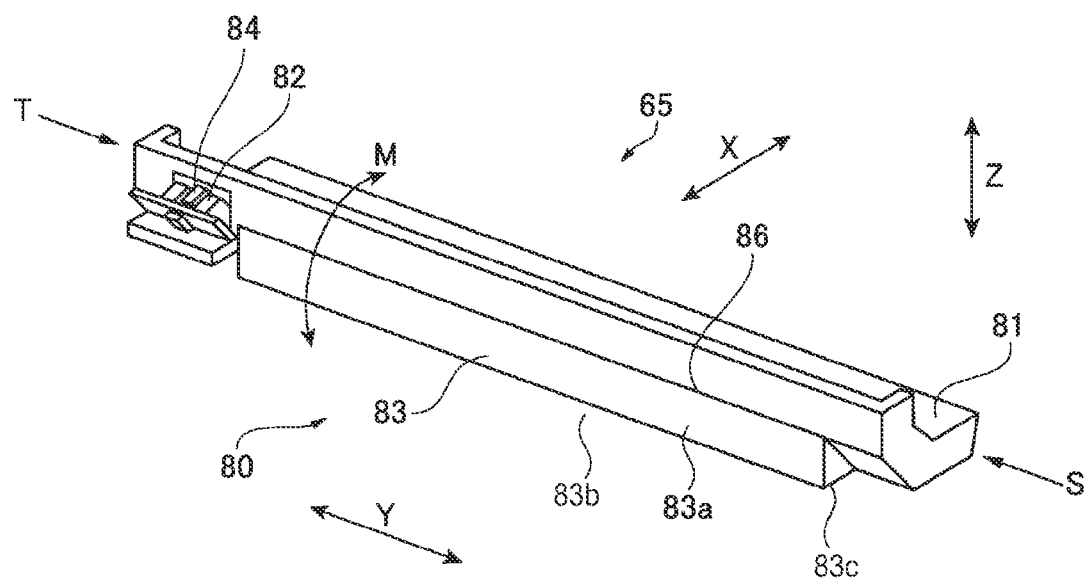
FIGS. 6A, 6B and 6C describe the media orientation detection means.
Figures 6B, 6C:
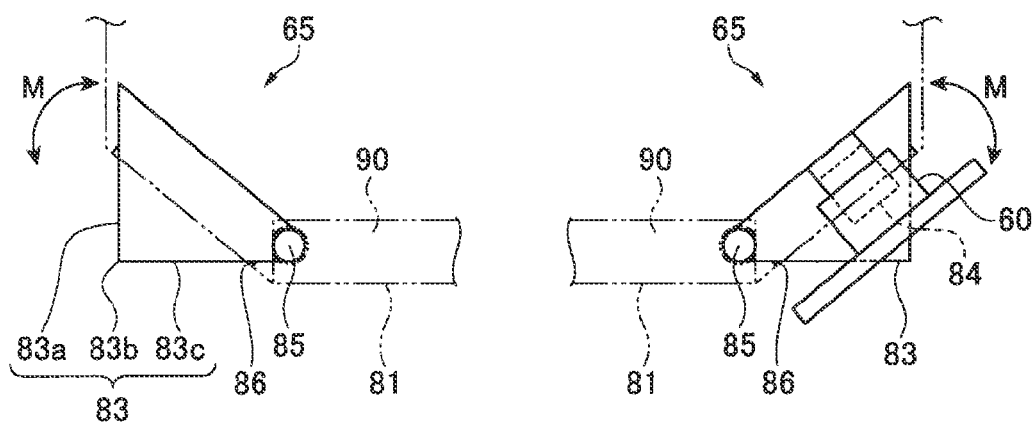

FIG. 6 describes the media orientation detection means 65, (A) being an oblique view of the media orientation detection means 65 from the direction in which the medium B is discharged, (B) being a view from the direction of arrow S in (A), and (C) being a view from the direction of arrow T in (A). Axes X, Y, Z in FIG. 6 are the same as axes X, Y, Z in FIG. 1.

As shown in FIG. 4, the media orientation detection means 65 is disposed to a position opposite the paper guide surface 78 of the paper stage 72 at the paper exit 28 of the outside case 11, that is, to a position facing the printing surface of the printed medium B resting on the paper guide surface 78.

As shown in FIG. 6, the media orientation detection means 65 includes a detection lever 80, a detection lever support 81, and a detector 82.

The detection lever 80 is plastic in this example, and includes a sensing part 83, a interrupter 84, and support pins 85. The sensing part 83 is the main body of the detection lever 80, and is triangular in section with two rectangular surfaces 83a, 83c, the long sides of which are aligned with the y-axis in FIG. 6 and have a length greater than the maximum width of the medium B, that meet at a single peak 83b. Two support pins 85 are formed extending from the one surface 83c on an extension of the opposite long side as peak 83b. A rectangular interrupter 84 is formed protruding from one end on the y-axis.

As shown in FIG. 4, the detection lever support 81 is the top part on the z-axis in FIG. 1 of the paper exit 28 formed in the front case 12. A rectangular window 86 with the long side on the y-axis is formed in the detection lever support 81, and the triangular section part of the sensing part 83 of the detection lever 80 can fit into this window 86 with the peak 83b on the outside. Support receivers 90 are disposed to positions that receive the two support pins 85 of the detection lever 80 when the sensing part 83 is fit into the window 86. As a result, the detection lever 80 can pivot on these two support pins 85 in the direction in which the peak 83b of the sensing part 83 moves in and out through the window 86 in the detection lever support 81 (the direction of arrow M in FIG. 6).

A detector 82 with a sensing part in the range of movement of the interrupter 84 disposed at one end when the detection lever 80 pivots on the support pins 85 is also disposed to the detection lever support 81. The detector 82 is preferably a transmissive photosensor, for example. The detector 82 includes an emitter and a receptor, and the receptor receives light emitted from the emitter. The detector 82 outputs a signal based on whether light was detected by the receptor, or the amount of light received by the receptor. As a result, sensor output changes and operation of the detection lever 80 can be detected based on whether or not the interrupter 84 interrupts the light beam of the detector 82.

Also referring to FIG. 4 and FIG. 6, the method of detecting the orientation of the medium B is described next. The medium B on which an image was printed by the print mechanism 61 described above is conveyed by the print mechanism 61 until the trailing end of the slip issued as a ticket reaches the cutting position of the automatic paper cutter 60, and then rests on the paper stage 72.

The operator then lifts the printed medium B when the operator wants to issue the ticket, for example. The medium B raised from the resting position thus contacts the sensing part 83 (the peak 83b part) of the detection lever 80 of the media orientation detection means 65. When the medium B is raised further, the sensing part 83 of the detection lever 80 in contact with the medium B pivots on the two support pins 85 and rotates in the direction of arrow M. The interrupter 84 formed in unison with the detection lever 80 therefore also pivots. As a result, the interrupter 84 moves out of the optical axis of the detector 82 of the media orientation detection means 65, and the output of the detector 82 changes.

By detecting this change in output, change in the orientation (displacement in a specific direction) of the medium B that stops on the paper stage 72 can be detected. Note that the length on the y-axis of the sensing part 83 is greater than the width of the medium B. As a result, the detection lever 80 can still pivot, and change in the orientation of the medium B can be detected, even if the operator twists or lifts the medium B at an angle to the paper width.

Figure 7:
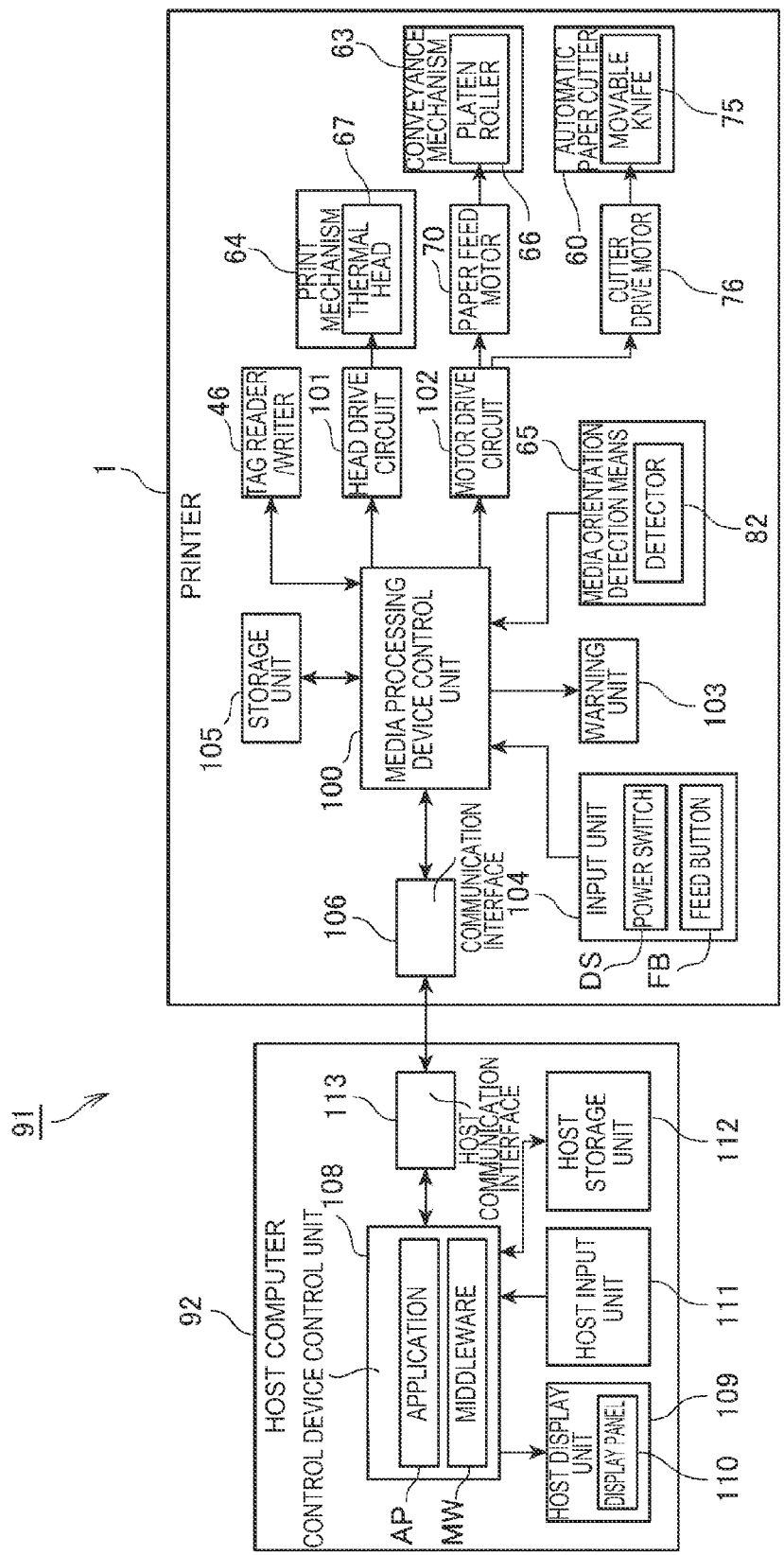
FIG. 7 is a block diagram illustrating the functional configuration of the host computer and printer.

FIG. 7 is a block diagram illustrating the functional configuration of a media processing system 91 according to this embodiment of the invention.

The media processing system 91 includes a printer 1 (media processing device) and a host computer 92 (control device). Configured as described above, the printer 1 is a device that cuts a medium B and issues a ticket after discharging a specific amount of the medium B from the paper exit 28. The host computer 92 is a computer that controls the printer 1, and can send control data (described below) instructing processing media to the printer 1.

As shown in FIG. 7, the printer 1 has a media processing device control unit 100 (control unit).

The media processing device control unit 100 includes CPU, ROM, RAM, and other peripheral circuits, and controls the printer 1.

The media processing device control unit 100 controls the tag reader/writer 46 to read data from and write data to an RFID tag 7A. For example, when the paper label 7 is used as a baggage tag, the media processing device control unit 100 may write data identifying the airline, airport of departure, destination airport, transiting airports, the service counter where the baggage tag was issued, the number of the boarding pass, and the flight number to the RFID tag 7A.

In this embodiment of the invention, the tag reader/writer 46 functions as a processing unit that processes the medium B as controlled by the media processing device control unit 100 based on control data received from the host computer 92.

The media processing device control unit 100 controls the head drive circuit 101, drives the thermal head 67, and prints images on the medium B.

In this embodiment of the invention, the print mechanism 64 functions as a processing unit that processes the medium B as controlled by the media processing device control unit 100 based on control data received from the host computer 92.

The media processing device control unit 100 also controls a motor drive circuit 102 and drives the paper feed motor 70. When the paper feed motor 70 is driven, the platen roller 66 turns and conveys the medium B according to rotation of the platen roller 66.

In this embodiment of the invention the conveyance mechanism 63 functions as a conveyance unit as controlled by the media processing device control unit 100.

The media processing device control unit 100 also controls the motor drive circuit 102 and drives the cutter drive motor 76. The movable knife 75 moves and cuts the medium B when the cutter drive motor 76 is driven.

In this embodiment, the automatic paper cutter 60 functions as a cutting unit as controlled by the media processing device control unit 100.

As described above, the detector 82 outputs the detection value of the sensor to the media processing device control unit 100. Based on change in the output of the detector 82, the media processing device control unit 100 detects that the medium B was displaced upward.

The warning unit 103 includes a buzzer, and produces an electronic sound in a specific mode as controlled by the media processing device control unit 100.

The input unit 104 includes a power switch DS and feed button FB, detects operation thereof, and outputs to the media processing device control unit 100.

The storage unit 105 includes EEPROM or other nonvolatile memory, and nonvolatilely stores data rewritably.

The communication interface 106 communicates with the host computer 92 according to specific communication protocol as controlled by the media processing device control unit 100. The communication interface 106 and media processing device control unit 100 and media processing device control unit 100 together function as a communication unit.

As shown in FIG. 7, the host computer 92 includes a control device control unit 108.

The control device control unit 108 has a CPU, ROM, RAM, and other peripheral circuits, and controls other parts of the host computer 92.

The host display unit 109 has an LCD panel or other display panel 110, and displays images on the display panel 110 as controlled by the control device control unit 108.

The host input unit 111 is connected to operating switches or input devices, detects operation of the operating switches or input devices, and outputs to the control device control unit 108.

The host storage unit 112 includes EEPROM, a hard disk drive, or other nonvolatile memory, and stores data rewritably.

The host communication interface 113 communicates with the printer 1 according to a specific communication protocol as controlled by the control device control unit 108.

The operation of the host computer 92 and the printer 1 are described next.

Figure 8:
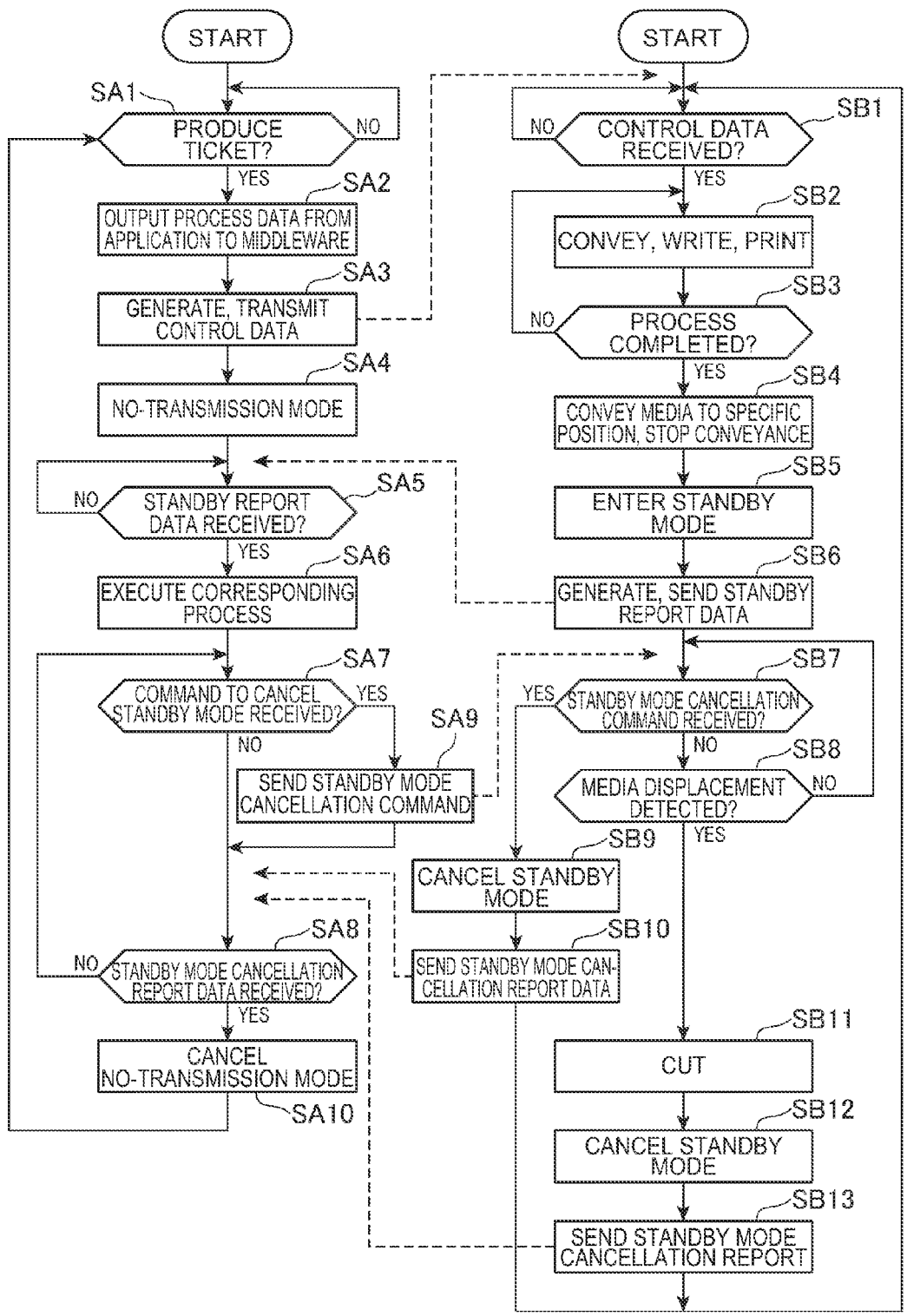
FIG. 8 is a flow chart of the operation of the host computer and printer.

FIG. 8 is a flow chart showing the operation of the host computer 92 and the printer 1 when processing medium B. Column (A) shows the operation of the host computer 92, and (B) shows the operation of the printer 1.

An application AP is installed on the host computer 92. The application AP has a function for generating data ("write data" below) including the information to be written to the RFID tag 7A of the ticket to be issued, and data ("print data" below) including information related to the image to be printed on the ticket, when producing a ticket.

Also the host computer 92 can run middleware MW.

The middleware MW is one or a plurality of software programs that function as an interface between applications AP and the operating system of the host computer 92. More specifically, the middleware MW in this embodiment functions as a device driver for controlling the printer 1. In other words, the middleware MW has functions for generating and sending control data to the printer 1 based on the input process data when process data including the write data and print data described above is input from an application AP. The control data is data conforming to the command language of the printer 1. Print control data and write control data are included in the control data. In this example, the print control data is data conforming to the command language of printer 1, and is data instructing printing an image. The write control data is also data conforming to the command language of printer 1, and is data instructing writing data to the RFID tag 7A.

To produce a ticket, the application AP therefore simply generates write data and print data, and outputs process data including the foregoing data to the middleware MW according to a protocol.

As shown in FIG. 8 (A), the application AP on the host computer 92 determines if a ticket is to be produced (step SA1). The application AP may, for example, determine to issue a ticket when required information is input and a command to produce a ticket has been entered through a specific user interface provided by the application AP. Alternatively, the application AP could determine to issue a ticket when required information is input and a command to produce a ticket have been input from an external device such as a connected server.

To produce a ticket (step SA1 returns YES), the application AP generates process data including write data including the information to write to the RFID tag 7A of the issued ticket, and print data including information related to the image to print on the ticket. The application AP then outputs the generated data to the middleware MW (step SA2). Based on the process data, the middleware MW generates and sends control data to the printer 1 (step SA3).

Next, the middleware MW enters a no-transmission state in which control data is not sent to the printer 1 (step SA4). While in this no-transmission state, the middleware MW or the application AP prohibits sending control data to the printer 1. Alternatively, a configuration in which a function of the middleware MW or the application AP displays an appropriate message on the display panel 110 and does not accept a ticket production command when in the no-transmission state is also conceivable.

After entering the no-transmission state, the control device control unit 108 monitors if standby report data is received (step SA5). The standby report data and the process executed by the host computer 92 after the data is received are further described below.

The media processing device control unit 100 of the printer 1 monitors if control data is received (step SB1).

If control data was received (step SB1 returns YES), the media processing device control unit 100 controls the conveyance mechanism 63 (such as the paper feed motor 70) to convey the medium B appropriately based on the control data, and at the specified timing writes data to the RFID tag 7A with the tag reader/writer 46 based on the write control data contained in the control data, and prints an image with the print mechanism 64 (such as the thermal head 67) based on the print control data contained in the control data (step SB2). The process performed in this step SB2 is an example of a process applied by the processing unit to the medium B.

While the process of step SB2 executes, the media processing device control unit 100 monitors if processing the medium B was completed (step SB3). More specifically, the media processing device control unit 100 checks if writing data to the RFID tag 7A based on the write control data, and printing an image based on the print control data, are completed.

Completion of writing data to the RFID tag 7A means that writing the data to be written to the RFID tag 7A based on the write control data contained in the control data to the RFID tag 7A has been completed. Completion of printing an image means that printing the images to be printed based on the print control data contained in the control data has been completed. Whether or not both writing data to the RFID tag 7A and printing of images are completed is monitored in step SB3.

When processing is completed, the media processing device control unit 100 controls the conveyance mechanism 63 to convey the medium B so that the position where the medium B is to be cut (the "cut position" below) is set to the cutting position of the automatic paper cutter 60, and then stops conveyance (step SB4).

The cut position of the medium B is the position corresponding to the end of the ticket processed by the processing unit based on the control data. By cutting the medium B at this cut position, a length of medium corresponding to one ticket is cut from the medium B and a ticket is produced.

Next, the media processing device control unit 100 enters the standby mode (step SB6).

In the standby mode, the media processing device control unit 100 keeps conveyance of the medium B stopped. More specifically, the media processing device control unit 100 keeps the paper feed motor 70, which is a stepper motor, in a hold mode during the standby mode, and thereby restricts movement of the medium B in the conveyance direction (movement in the direction moving toward the paper exit 28). More specifically, by keeping the paper feed motor 70 in the hold mode, the media processing device control unit 100 restricts rotation of the platen roller 66 in the medium B conveyance direction. Because the medium B is held pressed between the thermal head 67 and the platen roller 66, movement of the medium B in the medium B conveyance direction is restricted by restricting rotation of the platen roller 66.

Because movement of the medium B is thus controlled, the cutting position of the medium B is prevented from shifting from the cutting position of the automatic paper cutter 60 even if some force is applied to the medium B, such as when the user displaces the medium B in order to cut the medium B or the medium B is pulled. The paper feed motor 70 that functions as a limiting member restricting rotation of the platen roller 66, and the media processing device control unit 100 (drive control unit) that holds the paper feed motor 70, together function as a shifting prevention unit in this embodiment of the invention.

In the standby mode, the media processing device control unit 100 also prohibits printing by the print mechanism 64 and writing data to the RFID tag 7A by the tag reader/writer 46. In other words, the media processing device control unit 100 prohibits processing of the medium B by any processing unit when in the standby mode.

When in the standby mode, the media processing device control unit 100 also monitors change in the sensor output of the detector 82 of the media orientation detection means 65 described above, and monitors change in the orientation (displacement in a specific direction) of the medium B waiting on the paper stage 72. In other words, detection of the media orientation is not done in the standby mode, and the medium B is therefore not cut based on detection of a change in orientation even if the orientation of the medium B changes.

After entering the standby mode, the media processing device control unit 100 (communication unit) generates standby report data (information indicating that detection of media displacement by the detection unit is paused) and sends the data through the communication interface 106 to the host computer 92 (step SB6).

The standby report data is data reporting a standby mode, or more specifically that starting displacement detection of the medium B is delayed, to the host computer 92.

The printer 1 according to this embodiment thus enters a standby mode and stops processing media by the processing unit when standby report data (information indicating delaying detection of media displacement detection by the detection unit) is generated.

As described above, the control device control unit 108 checks if the standby report data was received after changing to the no-transmission state (step SA5). If the standby report data was received, that is, if a report that the standby mode started is received, (step SA5 returns YES), the control device control unit 108 runs the corresponding process (step SA6). For example, the control device control unit 108 controls the host display unit 109 to display on the display panel 110 that the printer 1 is waiting. By thus informing the user that the printer 1 is waiting, the user can be prompted to move and cut the media.

After executing the process in step SA6, the control device control unit 108 goes to step SA7.

In step SA7, the control device control unit 108 watches for a command to cancel the standby mode of the printer 1 (step SA7), and waits to receive a standby mode cancellation report (step SA8).

The operation of step SA7 is further described below.

A command to cancel the standby mode of the printer 1 can be input by the user through a user interface provided by the application AP, or asserted from an external device such as a connected server. As described above, the printer 1 prohibits processing medium B while in the standby mode. As a result, the user issues a cancel standby mode command to the printer 1 when cancelling prohibition of processing the medium B and starting processing the medium B to produce the next ticket is desirable.

If a cancel printer 1 standby mode command is detected in step SA7 (step SA7 returns YES), the control device control unit 108 generates and sends standby mode cancellation command data (cancellation data instructing cancelling delay of detecting media displacement) to the printer 1 (step SA9). After step SA9, the control device control unit 108 goes to step SA8.

The operation of step SA8 is described below.

As shown in FIG. 8 (B), after sending the standby report data in step SB6, the media processing device control unit 100 checks if standby mode cancellation command data was received (step SB7), and checks if a change in the position of the medium B was detected by the media orientation detection means 65 (step SB8).

If the standby mode cancellation command data was received (step SB7 returns NO), the media processing device control unit 100 cancels the standby mode (step SB9). More specifically, the media processing device control unit 100 cancels waiting to detect media displacement based on the standby mode cancellation command data (cancellation data instructing cancelling delay of detecting media displacement).

When the standby mode is cancelled, detecting change in the medium B orientation stops, and the medium B is not cut even if the orientation of the medium B changes. Further accompanying cancelling the standby mode, the media processing device control unit 100 cancels prohibition of printing with the print mechanism 64 and writing data to the RFID tag 7A by the tag reader/writer 46. More specifically, the media processing device control unit 100 allows processing the medium B by a processing unit.

As described above, the media processing device control unit 100 in this embodiment stops the standby mode and cancels prohibition of processing the medium B by a processing unit when data instructing standby mode cancellation is received from the host computer 92. As a result, if the printer 1 is waiting to detect medium B displacement and prohibits processing media by the processing unit, the host computer 92 can cancel prohibiting media B processing in the printer 1.

Next, the media processing device control unit 100 generates and sends standby mode cancellation command data to the host computer 92 (step SB10). This standby mode cancellation command data is data reporting that the standby mode is cancelled and prohibition of processing by the processing units (print mechanism 64, tag reader/writer 46) is cancelled.

The media processing device control unit 100 then returns to step SB1.

If change in the orientation of the medium B is detected without receiving the standby mode cancellation command data (step SB8 returns YES), the media processing device control unit 100 executes the following process. That a change in the orientation of the medium B was detected by the media orientation detection means 65 means that the user intentionally moved the medium B in order to cut the medium B (issue a ticket).

If a change in the medium B orientation was detected, the media processing device control unit 100 controls the automatic paper cutter 60 to cut the medium B (step SB11).

As described above, rotation of the platen roller 66 is stopped, and the medium B is held between the platen roller 66 and thermal head 67, when in the standby mode. The medium B therefore does not move in the conveyance direction, and the cutting position of the medium B does not shift from the cutting position of the automatic paper cutter 60, even if the user moves the medium B before the medium B is cut in step SB11. The cutting position of the medium B and the cutting position of the automatic paper cutter 60 also do not shift during cutting, and the medium B is cut at the intended position.

After cutting the medium B, the media processing device control unit 100 cancels the standby mode (step SB12).

When the standby mode is cancelled, detecting change in the medium B orientation stops, and the medium B is not cut even if the orientation of the medium B changes. Further accompanying cancelling the standby mode, the media processing device control unit 100 cancels prohibition of printing with the print mechanism 64 and writing data to the RFID tag 7A by the tag reader/writer 46. More specifically, the media processing device control unit 100 allows processing the medium B by a processing unit.

Next, the media processing device control unit 100 generates and sends the standby mode cancellation report data (second information indicating that waiting for media displacement ended) to the host computer 92 (step SB13). The media processing device control unit 100 in this embodiment thus reports to the host computer 92 (control device) that the medium B was cut by the automatic paper cutter 60 based on detecting displacement of the medium B, and prohibiting processing media by a processing unit was cancelled. As a result, the host computer 92 knows that the printer 1 cancelled prohibition of processing media by a processing unit, and based thereon can execute an appropriate process.

The media processing device control unit 100 then returns to step SB1.

As described above, when the medium B is displaced in a specific direction while in the standby mode in operating mode MA1, or in other words, when the medium B is moved so that it is displaced in a specific direction by the user, the medium B is cut and a ticket is issued. More specifically, a ticket is not issued unless the user intentionally moves the medium B. As a result, tickets can be prevented from accumulating at the paper exit 28 as a result of tickets being continuously produced automatically when not intended by the user. Tickets becoming intermixed with other tickets and being mistakenly mishandled by the user as a result of tickets being produced continuously automatically can also be prevented.

As shown in FIG. 8 (A), the control device control unit 108 checks if the standby mode cancellation report data was received in step SA8. If the standby mode cancellation report data has not been received (step SA8 returns NO), the control device control unit 108 returns to step SA7; if the standby mode cancellation report data has been received (step SA8 returns YES), the control device control unit 108 goes to step SA10.

In step SA10, the control device control unit 108 cancels the no-transmission state (step SA6) and transitions to a state enabling sending control data to the printer 1. Next, the process returns to step SA1, and determines whether or not to produce a ticket using a function of the application AP.

The host computer 92 in this embodiment thus stops transmission of the next control data until a report indicating that prohibition of processing media by a processing unit was cancelled is received from the printer 1 (until the standby mode cancellation report data is received) after sending control data instructing writing data and printing. Control data is therefore not sent by the host computer 92 in this configuration until the standby mode is cancelled and prohibition of processing medium B is cancelled in the printer 1. More specifically, outputting control data continuously from the host computer 92 to the printer 1 is prevented. As a result, problems such as the receive buffer of the host computer 92 overflowing and tickets not being issued in response to requests from the host computer 92 can be prevented.

As described above, the media processing device control unit 100 in this embodiment of the invention generates information (standby report data) indicating that detecting displacement of the medium B by the media orientation detection means 65 is on hold after entering a standby mode and accordingly stopping conveyance of the medium B by the conveyance unit. Functioning as communication unit, the media processing device control unit 100 then sends this standby report data to the host computer 92.

When the medium B is moved so that it is displaced in a specific direction in this embodiment of the invention, the medium is cut and a ticket is issued. As a result, tickets being automatically produced continuously and then accumulating at the paper exit (paper exit 28) can be prevented.

Based on standby report data received from the printer 1, the host computer 92 in this embodiment recognizes that the printer 1 is waiting to detect medium B displacement, and based thereon can execute a corresponding process.

The media processing device control unit 100 in this embodiment also stops (prohibits) processing medium B by a processing unit when the standby report data is generated.

While waiting for detection of medium B displacement by the media orientation detection means 65 in this embodiment of the invention, processing medium B by a processing unit is stopped.

After cutting the medium B with the automatic paper cutter 60 based on detecting media displacement, the media processing device control unit 100 in this embodiment of the invention generates standby mode cancellation report data (second information) indicating that waiting to detect medium B displacement has ended, and then functioning as a communication unit, the media processing device control unit 100 transmits the standby mode cancellation report data.

The host computer 92 in this embodiment of the invention can recognize that the printer 1 has stopped waiting to detect media displacement, and based thereon can execute a corresponding process.

The host computer 92 in this embodiment stops transmitting control data after receiving the standby report data.

When the printer 1 is waiting to resume detecting displacement of the medium B, this configuration can prevent the host computer 92 from sending control data and unprocessed control data accumulating in the printer 1 as a result, for example.

After receiving the standby report data, the host computer 92 in this embodiment sends standby mode cancellation command data instructing cancelling waiting to detect media displacement, and based on this standby mode cancellation command data, the media processing device control unit 100 cancels waiting to detect media displacement.

While the printer 1 waits to detect media displacement by the media orientation detection means 65, this configuration enables the host computer 92 to cancel the state in which the printer 1 waits for media displacement detection.

As described above, the media processing device control unit 100 (control unit) in this embodiment of the invention executes the following process. Based on control data received from the host computer 92, the media processing device control unit 100 processes medium B by a processing unit, and stops conveying the medium B. Next, the media processing device control unit 100 prohibits processing medium B by the processing unit, waits until displacement of the medium B is detected by the media orientation detection means 65, and reports that it entered a standby mode to the host computer 92. When displacement of the medium B is detected by the media orientation detection means 65 while waiting in the standby mode, the media processing device control unit 100 cuts the medium B with the automatic paper cutter 60 and cancels prohibition of processing medium B by the processing unit.

When the medium B is moved and displaced in the specific direction in this configuration, the medium B is cut and a ticket is issued. As a result, accumulation of tickets near the paper exit (paper exit 28) due to tickets being automatically produced continuously can be prevented. When entering the standby mode waiting to detect displacement of the medium B, the printer 1 in this configuration reports it started waiting to the host computer 92. As a result, the host computer 92 knows that the printer 1 has started waiting, and based thereon can execute an appropriate process, such as reporting to the user.

In this embodiment of the invention the media processing device control unit 100 cuts the medium B with the automatic paper cutter 60 based on detection of displacement of the medium B by the media orientation detection means 65, and reports when prohibition of processing medium B by the processing unit is cancelled by sending standby mode cancellation report data to the host computer 92.

This configuration enables the host computer 92 to know that the printer 1 has cancelled prohibiting processing medium B by the processing unit, and based thereon can execute an appropriate process, such as cancelling the no-transmission mode.

When standby mode cancellation command data instructing cancelling the standby mode is received from the host computer 92 after waiting starts, the media processing device control unit 100 in this embodiment of the invention stops the standby mode and cancels prohibition of processing medium B by the processing unit.

While the printer 1 waits for detection of media displacement by the media orientation detection means 65 and prohibits processing medium B by the processing unit, the host computer 92 in this configuration can cancel prohibition of processing media by a processing unit in the printer 1.

After sending control data to the printer 1, the host computer 92 in this embodiment stops sending the next control data until the standby mode cancellation report data is received.

This configuration can prevent problems such as control data being output continuously from the host computer 92 to the printer 1, the printer 1 buffer overflowing as a result, and tickets not being produced in response to host computer 92 requests.

The invention is described above with reference to a preferred embodiment thereof, but the invention is not limited thereto and can be modified and adapted in many ways without departing from the scope of the accompanying claims.

For example, displacement of the medium B in a specific direction is detected by the media orientation detection means 65. However, the means of detecting displacement of the medium B in a specific direction could be any configuration capable of detecting displacement. For example, a configuration having a reflective photosensor disposed to the paper stage 72 so that the sensor output changes when the medium B is displaced in a specific direction is also conceivable.

Furthermore, the printer 1 is a thermal printer in this example, but the method of printing is not limited to thermal printing.

The function blocks shown in FIG. 7 can be achieved as desired by the cooperation of hardware and software, and do not suggest a specific hardware configuration. Functions of the printer 1 and host computer 92 could also be handled by separate devices externally connected thereto. The printer 1 and host computer 92 could also operate as described above by executing programs stored on an externally connected storage medium.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A media processing device comprising:
a processing unit that processes media;
a conveyance unit that conveys the media;
an exit from which the media conveyed by the conveyance unit is discharged;
a detection unit that detects displacement of the media discharged from the paper exit in a direction different from the conveyance direction of the conveyance unit;
a cutting unit that cuts the media based on detection of said displacement by the detection unit;
a control unit that controls the processing unit to process the media and controls the conveyance unit to stop media conveyance, and then generates information indicating waiting for detection of the displacement by the detection unit; and
a communication unit that transmits the information; wherein
after cutting the media based on the detection unit detecting media displacement at the cutting unit, the control unit generates second information indicating that waiting to detect media displacement ended; and
the communication unit transmits the second information.

2. The media processing device described in claim 1, wherein:
the control unit stops processing the media by the processing unit when generating the information.

3. The media processing device described in claim 1, wherein:
the processing unit is a print unit that prints on the media.

4. The media processing device described in claim 1, wherein:
the media has an IC tag in which data is stored; and
the processing unit is a reader/writer unit that reads/writes data in the IC tag.

5. A media processing system comprising:
a control device that transmits control data instructing processing media; and
a media processing device including
a processing unit that processes media,
a conveyance unit that conveys the media,
an exit from which the media conveyed by the conveyance unit is discharged,
a detection unit that detects displacement of the media discharged from the paper exit in a direction different from the conveyance direction of the conveyance unit,
a cutting unit that cuts the media based on detection of said displacement by the detection unit,
a control unit that processes the medium by the processing unit, stops media conveyance by the conveyance unit, and then generates information indicating waiting detection of the displacement by the detection unit, and
a communication unit that transmits the information; wherein
after cutting the media based on the detection unit detecting media displacement at the cutting unit, the control unit of the media processing device generates second information indicating that waiting to detect media displacement ended; and
the communication unit of the media processing device transmits t second information to the control device.

6. The media processing system described in claim 5, wherein:
the control device stops transmitting the control data after receiving the information.

7. The media processing system described in claim 5, wherein:
the control device transmits cancellation data instructing cancelling pausing displacement detection after receiving the information; and
the control unit of the media processing device cancels pausing displacement detection based on the cancellation data.

8. The media processing system described in claim 5, wherein:
the processing unit is a print unit that prints on the media.

9. The media processing system described in claim 5, wherein:
the media has an IC tag in which data is stored; and
the processing unit is a reader/writer unit that reads/writes data in the IC tag.

10. A control method of a media processing device, comprising:
receiving control data instructing processing media;
processing the media based on the received control data;
stopping media conveyance after processing the media;
generating and transmitting information indicating waiting for detection of media displacement in a direction different from the conveyance direction of the media when media conveyance stops;
cutting the media when media displacement is detected; and
generating and transmitting second information indicating that waiting to detect media displacement ended after cutting the media based on the detection unit detecting media displacement at the cutting unit.

11. The control method of a media processing device described in claim 10, further comprising:

stopping processing the media when generating the information.

12. The control method of a media processing device described in claim 10, wherein:

the process is a process of printing on the media.

13. The control method of a media processing device described in claim 10, wherein:

the media has an IC tag in which data is stored; and the process is a reading/writing process that reads/writes data in the IC tag.

\* \* \* \* \*